Patented Apr. 18, 1950

2,504,797

UNITED STATES PATENT OFFICE 2,504,797

PRODUCTION OF SUBSTITUTED PYRANS

John George Mackay Bremner and David Gwyn Jones, Norton-on-Tees, England, assignors to Imperial Chemical Industries Limited, a corporation of Great Britain No Drawing. Application December 3, 1946, Serial No. 713,812
In Great Britain January 18, 1946

6 Claims. (Cl. 260—333)

This invention relates to the production of substituted pyrans.

According to the present invention there is provided a process for the production of acyloxypyrans which comprises reacting 2,3-dihydropyran or a substituted 2,3-dihydropyran with an organic carboxylic acid. The process of the invention is of particular value in relation to the chlor- and brom-substituted 2,3-dihydropyrans, in particular the mono-halogenated derivatives.

In accordance with the present invention, 2,3-dihydropyran or a substituted 2,3-dihydropyran may be reacted with a wide variety of monobasic or polybasic organic carboxylic acids which may be aliphatic, aromatic or heterocyclic and may contain substituent elements or groups. Examples of suitable acids are: the aliphatic monocarboxylic acids, in particular those containing up to 5 carbon atoms e. g., acetic. Other acids are glycollic, succinic, benzoic, salicylic, phthalic, naphthenic, monochloracetic, dichloracetic, and trichloracetic acetic aids.

When 5-chlor-2,3-dihydropyran and glacial acetic acid are reacted in this way the reaction may be represented by the equation:

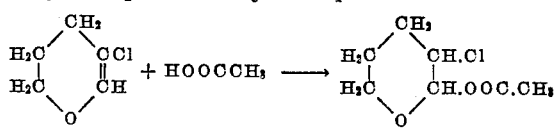

If desired, the process may be carried out in the presence of an inert liquid, as this facilitates the control of the temperature of reaction. Examples of suitable inert liquids are benzene, tetrahydronaphthalene and tetrahydropyran.

It is preferred to operate under substantially anhydrous conditions, since water tends to hydrolyze the reaction products. It is also preferable to neutralize the reaction mixture before separating the acyloxy-pyran.

The temperature at which the process is carried out will vary according to the other operating conditions and to the nature of the reactants and inert liquids if such are used, but it is convenient to operate at or near the boiling point of the reactant mixture when operating at atmospheric pressure in the absence of catalysts.

The products of the invention are useful solvents.

Example 1

23 gms. of 5-chlor-2,3-dihydropyran and 12.0 gms. of glacial acetic acid were warmed on the steam bath until the mixture showed no further decrease in acid value as measured by titration of a small sample of the reaction mixture with a standard solution of caustic soda. The time required to attain this state was about 2 hours. The product was distilled and the fraction boiling at 108–110° C. at a pressure of 12 mm. absolute was washed quickly with an aqueous solution of sodium carbonate and redistilled, whereby substantially pure 2-acetoxy-3-chlortetrahydropyran was obtained.

Example 2

21 gms. of 2,3-dihydropyran and 15 gms. of glacial acetic acid were heated on a steam bath for 1½ hours. A sample was cooled and titrated with caustic soda. After heating for a further half hour a second sample was similarly treated, and it was found that 57% of the acetic acid originally present had reacted and that equilibrium had been reached.

The product was cooled and poured into 100 ccs. of saturated sodium carbonate solution, and this mixture was extracted with 50 ccs. of ether. On removing the ether from the dried ethereal solution there was obtained 16.8 gms. of tetrahydropyryl acetate, having a boiling point of 60–60.5° C./2 mm.; $n_D^{20}$ 1.4368; C, 53.19% (calc. 58.35), H, 8.65 (calc. 8.39).

We claim:
1. A process for the production of acyloxy tetrahydropyrans having a single acyloxy group in the 6-position which comprises heating under substantially anhydrous conditions a mixture of a compound selected from the group consisting of 2,3-dihydropyran and 5-halo-2,3-dihydropyran, the halogen being selected from the group consisting of chlorine and bromine, with a carboxylic acid selected from the group consisting of acetic glycollic, succinic, benzoic, salicylic, phthalic, naphthenic, monochloracetic, dichloracetic and trichloracetic acids at temperture not higher than the boling point of said mixture.
2. The process of claim 1 wherein the reaction is carried out in the presence of an inert liquid.
3. The process of claim 1 wherein the carboxylic acid is acetic acid and the the 5-position substituted 2,3-dihydropyran is 5-chloro-2,3-dihydropyran.
4. The process of claim 1 wherein the carboxylic acid is acetic acid and the dihydropyran is 2,3-diphydropyran.
5. The process of claim 1 wherein the reaction mixture is neutralized prior to recovery of the product.
6. Tetrahydropyryl-6-monoacetate.

JOHN GEORGE MACKAY BREMNER.
DAVID GWYN JONES.

REFERENCES CITED

The following references are of record in the file of this patent:

Alder; Berichte, vol. 74, 1941, page 908.
Beilstein's Handbuch der Org. Chemie, Vierte Auflage, Erstes-Literatur, 1910–1919, Syst. 2418, page 111.